United States Patent
Cooper

(10) Patent No.: US 9,637,127 B1
(45) Date of Patent: May 2, 2017

(54) TWO-SPEED ELECTRIC DRIVE UNIT

(71) Applicant: Dana Automotive Systems Group, LLC, Maumee, OH (US)

(72) Inventor: Kenneth E. Cooper, Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 14/982,566

(22) Filed: Dec. 29, 2015

(51) Int. Cl.
| | |
|---|---|
| F16H 48/10 | (2012.01) |
| B60W 30/18 | (2012.01) |
| F16H 37/08 | (2006.01) |
| B60W 10/08 | (2006.01) |
| B60W 10/115 | (2012.01) |
| B60W 10/12 | (2012.01) |

(52) U.S. Cl.
CPC ............ B60W 30/18 (2013.01); B60W 10/08 (2013.01); B60W 10/115 (2013.01); B60W 10/12 (2013.01); F16H 37/0813 (2013.01); B60W 2510/081 (2013.01); B60W 2710/081 (2013.01); B60W 2710/1005 (2013.01)

(58) Field of Classification Search
None
See application file for complete search history.

(56) References Cited

U.S. PATENT DOCUMENTS

| | | | | |
|---|---|---|---|---|
| 2,147,145 A | * | 2/1939 | Carlson | F16H 3/64 184/11.1 |
| 2,618,359 A | * | 11/1952 | Alden | F16H 3/64 184/11.1 |
| 3,413,873 A | * | 12/1968 | Bixby | F16H 3/64 475/160 |
| 4,095,675 A | * | 6/1978 | Bell | F16H 3/64 184/6.12 |
| 4,227,427 A | * | 10/1980 | Dick | F16C 19/548 184/6.12 |
| 4,611,504 A | * | 9/1986 | Rundle | B60K 17/16 475/198 |
| 5,533,943 A | * | 7/1996 | Ichioka | F16H 1/28 475/198 |
| 5,620,387 A | | 4/1997 | Janiszewski | |
| 6,098,737 A | | 8/2000 | Aoki | |
| 6,117,038 A | * | 9/2000 | Nishiji | B60K 17/16 475/198 |
| 6,540,636 B2 | | 4/2003 | Amanuma et al. | |
| 6,827,663 B2 | | 12/2004 | Tucker-Peake | |
| 7,296,644 B2 | | 11/2007 | Teraoka | |
| 7,316,627 B2 | | 1/2008 | Bennett | |

(Continued)

*Primary Examiner* — Dirk Wright
(74) *Attorney, Agent, or Firm* — Marshall & Melhorn, LLC

(57) ABSTRACT

An electric drive unit for a vehicle including an electric motor, a differential housing, a reducing gear set, a drive input gear, a first clutch and a second clutch. The differential housing forms a carrier for a plurality of planetary gears which are in driving engagement with the drive input gear. The drive input gear is in driving engagement with the reducing gear which connected to the electric motor. A ring gear outside the differential housing is in driving engagement with the planetary gears. The first clutch can be engaged to couple the drive input gear to the differential housing resulting in the electric drive unit being placed in a first drive ratio and a second clutch can be engaged to ground the ring gear resulting in the electric drive unit being placed in a second drive ratio.

12 Claims, 2 Drawing Sheets

(56) References Cited

U.S. PATENT DOCUMENTS

| | | |
|---|---|---|
| 7,497,286 B2 | 3/2009 | Keller et al. |
| 8,454,473 B2 | 6/2013 | Reitz |
| 8,556,760 B2 | 10/2013 | Mack et al. |
| 8,585,520 B2 | 11/2013 | Turnbull et al. |
| 8,622,865 B2 | 1/2014 | Su |
| 8,678,968 B2 | 3/2014 | Troennberg et al. |
| 8,827,859 B2 * | 9/2014 | Fox ................ F16H 48/08 475/231 |
| 8,876,643 B2 | 11/2014 | Fickel et al. |
| 8,992,366 B2 | 3/2015 | Gassmann |
| 9,039,559 B2 | 5/2015 | Gassmann |
| 9,073,538 B2 | 7/2015 | Mack et al. |
| 2010/0267508 A1 | 10/2010 | Hvolka et al. |
| 2014/0371020 A1 | 12/2014 | Cooper et al. |
| 2015/0226296 A1 | 8/2015 | Gassmann |
| 2015/0226297 A1 | 8/2015 | Knoblauch et al. |

\* cited by examiner

TWO-SPEED ELECTRIC DRIVE UNIT

FIELD OF THE INVENTION

The present invention relates to electric drive systems for motor vehicles. More specifically, the present disclosure relates to a two-speed electric drive unit for electric or hybrid cars.

BACKGROUND OF THE INVENTION

Electric drive units typically comprise an electric motor and a reduction drive arranged to reduce the rotational movement produced by the electric motor. The torque is transmitted from the reduction drive to a differential assembly which splits the torque onto two output shafts for driving wheels.

Electric or hybrid vehicles with an electric drive unit have long been known. Hybrid electric vehicles have a structure which combines two power sources, typically an internal combustion engine and an electric motor, to produce lower emissions. Hybrid electric drive units are being developed for use in all-wheel drive vehicles such that the motor and the engine can transmit power to both a front set of driven wheels and rear set of driven wheels.

In all-wheel drive hybrid electric vehicles, a reduction gear set reduces an output speed from an electric driving motor and transmits the reduced output speed to a differential gear assembly. The differential gear assembly distributes the introduced torque to two output shafts for driving the wheels so that one of the two output shafts can rotate at different rates with respect to one another. The differential gear assembly can automatically make a rotation difference when the rotation difference between left and right wheels on an axle is required, i.e. when a vehicle turns or moves on uneven road surfaces, leading to smooth driving.

Hybrid all-wheel drive systems present packaging difficulties for vehicle design. The integration of an electric drive or a hybrid drive with a downstream reduction gear set and differential gear assembly in a motor vehicle is often difficult and costly due to additional components required for the electric drive and the limited available space.

SUMMARY OF THE INVENTION

An electric drive unit for a motor vehicle including an electric motor, a differential housing, a reducing gear set, a drive input gear, a ring gear, a plurality of planetary gears, a first clutching device and a second clutching device. The differential housing has a differential gear arrangement disposed therein and forms a carrier for the plurality of planetary gears. The drive input gear is partially disposed within the differential housing and includes a first portion forming a sun gear which is in driving engagement with the plurality of planetary gears and a second portion which is in driving engagement with the reducing gear set. The reducing gear is drivingly engaged with the electric motor. The ring gear is disposed outside the differential housing in driving engagement with the plurality of planetary gears. The first clutching device can be engaged to couple the drive input gear to the differential housing and a second clutching device which may be engaged to ground the ring gear, where in response to engagement of the first clutching device, the electric drive unit is placed in a first drive ratio and in response to engagement of the second clutching device, the electric drive unit is placed in a second drive ratio.

The electric drive unit as disclosed provides for different modes of operation and allows for on-road shifting for precise front to rear torque distribution which provides for improved off-road mobility for all-wheel drive vehicles.

The electric drive unit also provides for a high gear reduction ratio allowing for the use of a small low cost motor and inverter package in electric or hybrid all-wheel drive vehicles.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

The invention comprises a two-speed drive unit for an electric motor used in motor vehicles.

Figure 1:
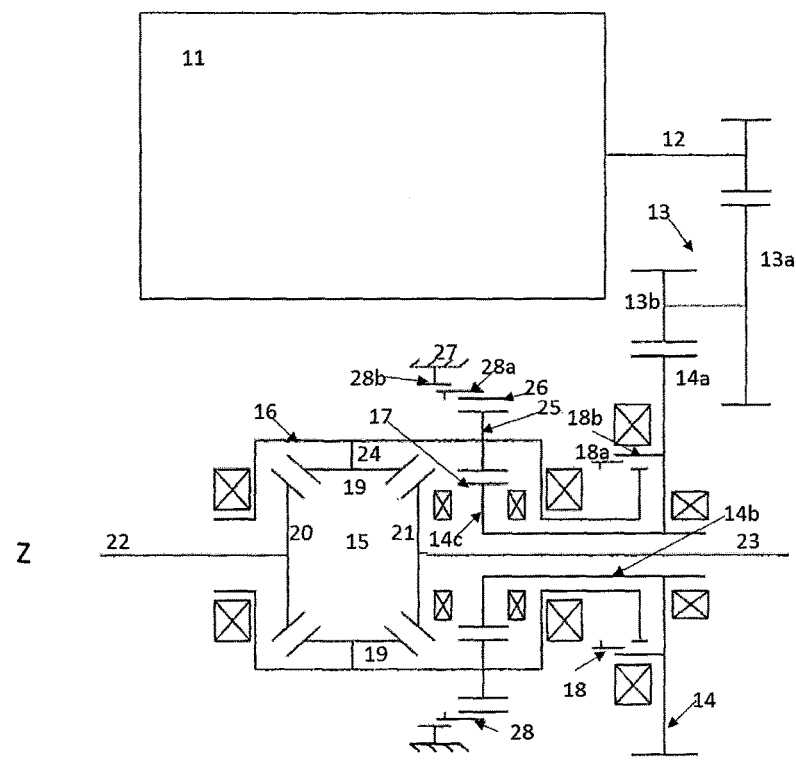
FIG. 1 is a schematic view of one preferred embodiment of an electric drive unit using two dog clutches.

As shown in FIG. 1, a preferred embodiment of an electric drive unit 10 includes an electric motor 11, an output shaft 12, a reducing gear set 13, a drive input gear 14 and a differential gear arrangement 15. In the preferred embodiment, the electric motor 11 is positioned radially outward from the differential gear arrangement 15.

Electric motor 11 is a stationary motor and is engaged with output shaft 12 to provide selective rotation of the output shaft 12. Output shaft 12 is drivingly engaged with a reducing gear set 13.

In FIG. 1, the reducing gear set 13 is positioned radially inward from output shaft 12. Other embodiments other than as shown in FIG. 1 are permissible. In one embodiment, the reducing gear set 13 includes a first reducing gear set 13a and a second reducing gear set 13b. A driven gear of the first reducing gear set 13a is drivingly connected to the output shaft 12 and a driven gear of the second reducing gear set 13b is drivingly connected to the drive input gear 14.

Drive input gear 14 includes two radially extending portions 14a, 14c and an axially extending portion 14b. The two radially extending portions 14a, 14c extend outward from portion 14b, one on each end of 14b. The axially extending portion 14b is partially located within a differential housing 16 with radially extending portion 14a extending outward outside the differential housing 16 and radially extending portion 14c extending outward inside differential housing 16. Radially extending portion 14a is drivingly engaged with a driven gear of the second reducing gear set 13b. The second radially extending portion 14c of the drive input gear has a sun gear 17 formed on the end thereof. The sun gear 17 is located within the differential housing 16 and is adjacent to a differential gear arrangement 15.

A first clutch 18 is adjacent to radially extending portion 14a of drive input gear outside the differential housing 16 and may be engaged to couple the drive input gear 14 to the differential housing 16. As shown in FIG. 1, the first clutch 18 may be a dog clutch including a clutch collar 18a having gear teeth (not shown) which are slidably received upon complementary gear teeth (not shown) on the end of the differential housing 16. Clutch collar 18a also includes gear teeth (not shown) complementary to gear teeth located on clutch hub 18b fixed for rotation on the radially extending portion 14a and extending axially thereon. The clutch collar 18a is slidably movable to engage or disengage the clutch hub 18b to the differential housing 16. First clutch 18 as shown in FIG. 1 is a dog clutch, but can be any form of clutch.

The differential housing 16 houses the differential gear arrangement 15 including a pair of pinion gears 19 and side gears 20, 21 rotatably supported in the differential housing 16. Differential housing 16 can rotate around the rotational axis Z along with two output shafts 22, 23 which are supported coaxially to rotational axis Z. Side gears 20, 21 mesh with pinion gears 19 and engage two output shafts 22, 23. The output shafts are axle half shafts that lead to the wheel ends (not shown). The pinion gears 19 are rotatably supported on a pinion shaft 24 which is connected to the differential housing 16.

A plurality of planetary gears 25 are mounted on differential housing 16 radially between the sun gear 17 and a ring gear 26. Ring gear 26 is disposed radially outside differential housing 16, while sun gear 17 is inside the differential housing 16. The planetary gears 25 drivingly engage the sun gear 17 and ring gear 26. The ring gear 26 is connected to a source of rotation energy such as a pinion gear (not shown).

Ring gear 26 may be selectively coupled to a drive unit housing 27. The drive unit housing 27 is stationary and houses ring gear 26. In FIG. 1, the drive unit housing 27 is located radially between the differential gear arrangement 15 and the electric motor 11. The ring gear 26 is positioned radially outward from the planetary gears 25 and radially inward from the stationary housing 27. When ring gear 26 is coupled to the drive unit housing 27, the ring gear 26 is grounded. When the ring gear 26 is disconnected from the drive unit housing 27 it rotates freely. Ring gear 26 is selectively coupled to the housing 27 via a second clutch 28.

The second clutch 28 is located outside the differential housing 16 radially between drive unit housing 27 and ring gear 26. As shown in FIG. 1, the second clutch 28 may be a dog clutch including a clutch collar 28a having gear teeth (not shown) which are slidably received upon complementary gear teeth (not shown) on a clutch hub 28b. Clutch collar 28a also includes gear teeth (not shown) complementary to gear teeth located on ring gear 26. The clutch collar 28a is slidably movable to engage or disengage the ring gear 26 to the drive unit housing 27. The second clutch 28 as shown in FIG. 1 is a dog clutch, but can be any form of clutch.

By controlling the speed of electric motor 11 relative to wheels (not shown) attached to output shafts 22, 23, clutches 18, 28 can be engaged under synchronous conditions. The electric drive unit 10 described above provides for two speed operation modes, a disconnect mode and a park mode.

When second clutch 28 is engaged with ring gear 26 and first clutch 18 is disengaged, differential gear arrangement 15 is driven through planetary gear set 25 causing a reduction in speed and an increase in torque for a high torque mode of operation, i.e. a second drive ratio.

When first clutch 18 is engaged to drive input gear 14 and second clutch 28 is disengaged, planetary gear set 25 is "locked out" and differential gear arrangement 15 is driven by drive input gear 14 through differential housing 16 resulting in a low torque mode of operation, i.e. a first drive ratio.

When first clutch 18 and second clutch 28 are engaged the electric drive unit 10 is in a park mode of operation which prevents the output shafts 22, 23 from rotating.

When first clutch 18 and second clutch 28 are both disengaged, differential gear arrangement 15 is back driven by output shafts 22, 23 resulting in a disconnect mode of operation. In one embodiment, by disengaging the first clutch 18 and second clutch 28 the electric drive unit 10 is disconnected from the axle allowing an all-wheel drive vehicle to operate in a two-wheel drive mode.

Figure 2:
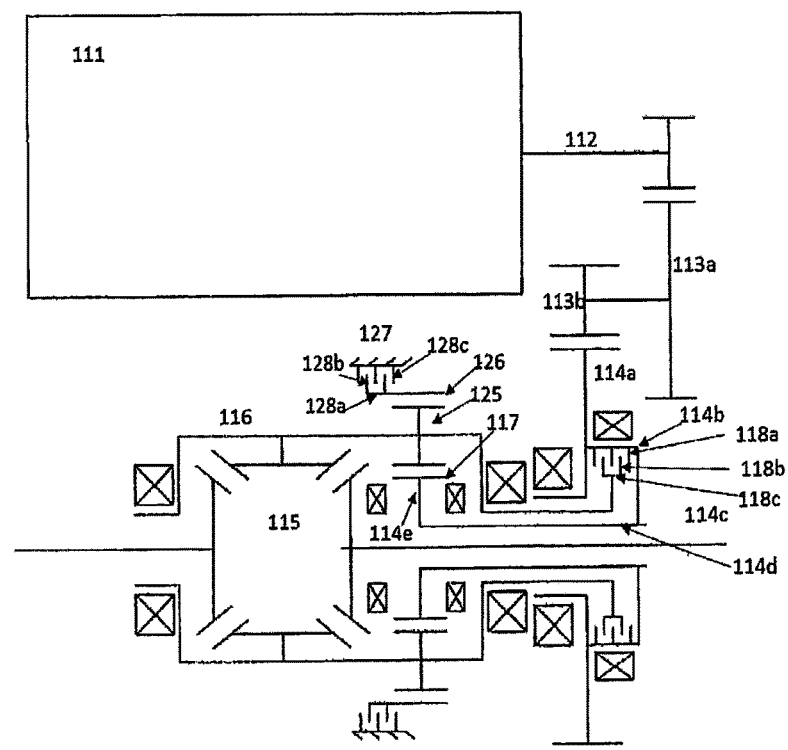
FIG. 2 is a schematic view of a second preferred embodiment of an electric drive unit using two wet clutches.

FIG. 2 depicts another preferred embodiment of the invention, electric drive unit 110. Electric drive unit 110 is substantially similar to electric drive unit 10, except that the first and second clutches are wet clutches. In the preferred embodiment, the electric drive unit 110 includes an electric motor 111, an output shaft 112, a reducing gear set 113 having a first reducing gear set 113a and a second reducing gear set 113b, a drive input gear 114 and a differential arrangement 115. In this embodiment, the drive input gear 114 has a first radially extending portion 114a, a first axially extending portion 114b, a second radially extending portion 114c, a second axially extending portion 114d and a third radially extending portion 114e. Radially extending portions 114c, 114e extend radially outward from the axially extending portion 114d, one on each end of 114d.

The first radially extending portion 114a is drivingly engaged with a driven gear of the second reducing gear set 113b. The first axially extending portion 114b is connected to the first radially extending portion 114a, opposite the end of the engagement with the second reducing gear set 113b, and includes a set of clutch plates 118a extending radially inward thereon. A second set of clutch plates 118b extend radially outward from a clutch hub 118c. The first and second set of clutches plates 118a, 118b are interleaved. The clutch hub 118c is attached to the end of the differential housing 116 and extends radially outward thereon. The clutch plates 118a, 118b, the first axially extending portion 114b and clutch hub 118c form the first wet clutch 118. The clutch plates 118a, 118b are axially moveable and are able to be urged together into frictional engagement with one another.

The second radially extending portion 114c extends radially inward from the end of first axially extending portion 114b, on the opposite end of first radially extending portion 114a, outside the differential housing 116 and connects to the second axially extending portion 114d. The second axially extending portion 114d extends toward the differential gear arrangement 115, away from second radially extending portion 114c, so that it is partially located within differential housing 116. The third radially extending portion 114e extends outward from the end of second axially extending portion 114d, on the end opposite the second radially extending portion 114c, inside differential housing 116. The third radially extending portion 114e of the drive input gear has a sun gear 117 formed on an end thereof.

When first clutch 118 is engaged, the drive input gear 114 is connected to the differential housing 116. When the first clutch 118 is disengaged, the drive input gear 114 is drivingly connected to a set of planetary gears 125 via sun gear 117.

In one embodiment, a second clutch 128 of the electric drive unit 110 is a wet clutch. A clutch hub 128a is connected to a drive unit housing 127. The clutch hub 128a includes a set of clutch plates 128b extending radially inward thereon. A second set of clutch plates 128c is attached to clutch hub 128a extending radially outward thereon. The clutch hub 128a includes a ring gear 126 on the end thereof. The clutch hub 128a is located between the electric drive unit housing 127 and ring gear 126. The clutch plates 128b, 128c are axially moveable and are able to be urged together into frictional engagement with one another.

Ring gear 126 may be selectively coupled to the drive unit housing 127 via second clutch 128. The drive unit housing 127 is stationary and houses the clutch hub 128a. When ring gear 126 is coupled to the drive unit housing 127, the ring gear is grounded. When the ring gear 126 is disconnected from the drive unit housing 127 it rotates freely.

Shifting the electric drive unit 10, 110 between different modes of operation can be accomplished by selectively engaging and disengaging clutches 18, 118, 28, 128. To selectively engage clutches 18, 118, 28, 128, the speed of the electric motor 11, 111 is accelerated or decelerated to a first or second synchronous speed which matches the speed of the differential housing 16, 116. The first synchronous speed allows clutches 18, 118 to be engaged and the second synchronous speed allows clutches, 28, 128 to be engaged. The time required to accelerate and decelerate electric motor 11, 111 will determine the speed for shifting from high torque to a low torque condition. If the time required to accelerate and decelerate electric motor 11, 111 is sufficiently quick, the electric drive unit will allow for on-road shifting.

To shift from a park mode of operation (i.e. both second 28, 128 and first 18, 118 clutches are engaged) to a low torque operational mode, second clutch 28, 128 is disengaged.

To shift from a low torque mode of operation (i.e. second clutch 28, 128 disengaged and first clutch 18, 118 engaged) to a high torque mode of operation, first clutch 18, 118 is disengaged, the speed of electric motor 11, 111 is adjusted to the second synchronous speed and second clutch 28, 128 is engaged.

To shift from a high torque mode (i.e. second clutch 28, 128 engaged and first clutch 18, 118 disengaged) to a disconnect mode of operation, the second clutch 28, 128 is disengaged and electric motor 11, 111 is powered down.

To shift from a disconnect mode (i.e. second clutch 28, 128 disengaged and first clutch 18, 118 disengaged) to a high torque mode of operation, the speed of electric motor 11, 111 is adjusted to the second synchronous speed and second clutch 28, 128 is engaged.

To shift from a disconnect mode (i.e. second clutch 28, 128 disengaged and first clutch 18, 118 disengaged) to a low torque mode of operation, the speed of electric motor 11, 111 is increased to the first synchronous speed and first clutch 18, 118 is engaged.

To shift from a high torque mode (i.e. second clutch 28, 128 engaged and first clutch 18, 118 disengaged) to a park mode, first clutch 28, 128 is engaged.

The electric drive unit 10, 110 can be incorporated into the front axle of a motor vehicle such that output shafts 22, 23 correspond to front axle half shafts of the vehicle or the electric drive unit 10, 110 can be incorporated into the rear axle of a motor vehicle such that output shafts 22, 23 correspond to rear axle half shafts of the vehicle.

In accordance with the provisions of the patent statutes, the present invention has been described in what is considered to represent its preferred embodiments. However, it should be noted that the invention can be practiced otherwise than as specifically illustrated and described without departing from its spirit or scope.

I claim:

1. An electric drive unit for a motor vehicle, comprising:
   an electric motor;
   a differential housing having a differential gear arrangement disposed therein, wherein the differential housing forms a carrier for a plurality of planetary gears;
   a reducing gear set drivingly connected to the electric motor;
   a drive input gear partially disposed within the differential housing, wherein the drive input gear has a first portion and a second portion, wherein the first portion is drivingly engaged with the plurality of planetary gears and the second portion is drivingly engaged with the reducing gear set;
   a ring gear disposed outside the differential housing, wherein the ring gear is drivingly engaged with the plurality of planetary gears;
   a first clutching device which may be selectively engaged to couple the drive input gear to the differential housing to establish a first drive ratio; and
   a second clutching device which may be selectively engaged to ground the ring gear to establish a second drive ratio.

2. The electric drive unit of claim 1, wherein the electric motor is positioned radially outward from the differential gear arrangement.

3. The electric drive unit of claim 1, wherein the first portion of the drive input gear is drivingly engaged with the plurality of planetary gears inside the differential housing.

4. The electric drive unit of claim 1, wherein the second portion of the drive input gear is drivingly engaged with the reducing gear set outside the differential housing.

5. The electric drive unit of claim 1, wherein the first clutching device is positioned adjacent to the second portion of the drive input gear and selectively couples the second portion of the drive input gear to the differential housing.

6. The electric drive unit of claim 1, further comprising a stationary drive unit housing positioned between the electric motor and the differential gear arrangement, wherein the second clutching device is selectively engaged to couple the ring gear to the stationary housing.

7. The electric drive unit of claim 1, further comprising a pair of axle half shafts connected to the differential gear arrangement wherein the axle half shafts are connected to wheels of a motor vehicle.

8. A method for operating a two-speed electric drive unit, the method comprising the steps of:
   providing an electric drive unit having an electric motor, a drive input gear, a differential housing, a differential gear arrangement located within the differential housing, a plurality of planetary gears, a ring gear drivingly engaged with the planetary gears outside the differential housing, a drive unit housing, a first clutching device which selectively couples the drive input gear to the differential housing and a second clutching device which selectively couples the ring gear to the drive unit housing, wherein the electric motor is positioned radially outward from the differential gear arrangement and the ring gear is positioned between the electric motor and the differential motor;

adjusting the speed of the electric motor to a first or second synchronous speed, wherein when the motor is at a first synchronous speed the first clutching device can be engaged and when the motor is at a second synchronous speed the second clutching device can be engaged; and selectively engaging or disengaging the first and second clutching devices to place the electric drive unit in different operational modes.

9. The method of claim 8, wherein the first clutching device is engaged and the second clutching device is disengaged placing the electric drive unit is a low torque operational mode.

10. The method of claim 8, wherein the first clutching device is disengaged and the second clutching device is engaged placing the electric drive unit is a high torque operational mode.

11. The method of claim 8, wherein the first and second clutching devices are engaged placing the electric drive unit is a park operation mode.

12. The method of claim 8, wherein the first and second clutching devices are disengaged placing the electric drive unit is a disconnected operation mode.

* * * * *